Dec. 3, 1957 G. E. SMITH 2,815,154
VALVED MEASURING CLOSURE FOR CONTAINERS
Filed June 7, 1956
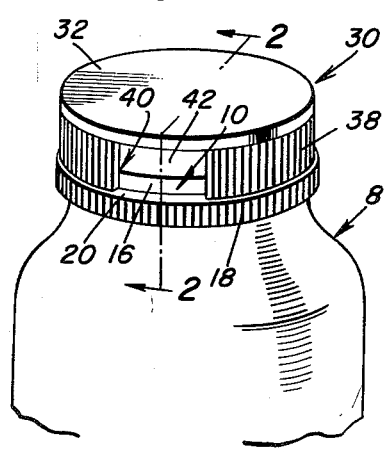
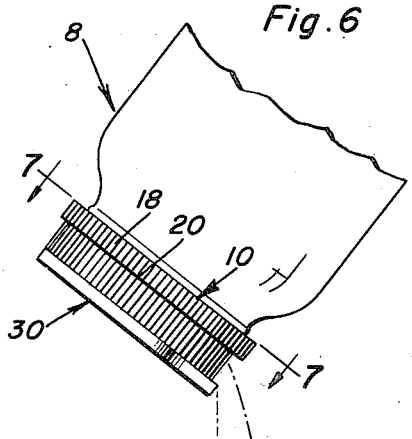
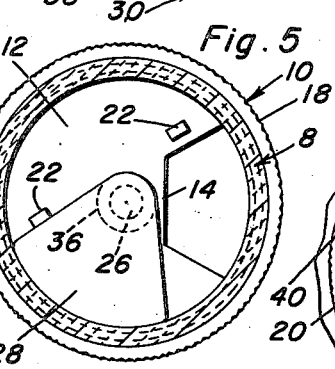
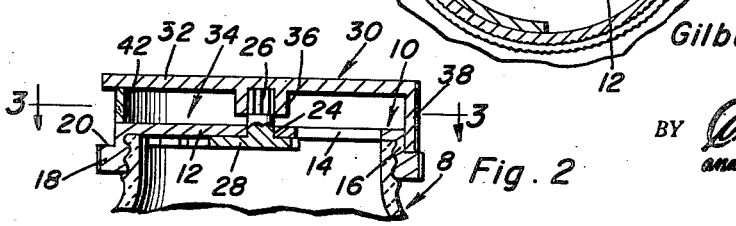
Gilbert E. Smith
INVENTOR.

United States Patent Office 2,815,154  
Patented Dec. 3, 1957

2,815,154

VALVED MEASURING CLOSURE FOR CONTAINERS

Gilbert E. Smith, Green Haven, Md., assignor of fifty percent to Colvin A. Smith, Green Haven, Md.

Application June 7, 1956, Serial No. 590,053

3 Claims. (Cl. 222—452)

This invention relates to an improved cap-type closure for commodity containers having novel quantity measuring and valved dispensing means embodied therein; and has reference to a simple, practical and economical non-corrodible twin cap construction which is especially, but not necessarily, designed and adapted for use on so-called instant coffee and tea jars, whereby a user thereof may readily invert the jar, trap the measurable amount of coffee and empty it into a drinking cup for use in the usual manner.

The customary procedure is to use a teaspoon, dip it into the jar of instant coffee and then empty a teaspoonful of coffee into a coffee cup. The present invention offers manufacturers, retailers and users a new way to achieve the desired end.

Briefly summarized, the improved closure is characterized by a readily attachable and detachable primary cap embodying a flat disk-like lid having at least one opening through which coffee is gravity discharged when the jar is intentionally held in an inverted dispensing position, a secondary cap connected to and mounted for rotation on said primary cap and embodying an imperforate lid disposed in spaced parallel alignment above said first named lid and cooperating therewith in defining and providing a coffee receiving, measuring dispensing trap, said secondary cap having a marginal rim provided with a trap emptying slot, a first valve carried by and turnable with said secondary cap and adapted to open and close said discharge opening, and a second valve fixedly mounted atop said first named lid and cooperating with said rim and slot in a manner to open and close said slot, said valves being arranged relative to each other and said discharge opening and slot that when the slot is closed, the discharge opening is open and vice versa, whereby coffee may be suitably measured and then dispensed into a cup.

Novelty is also predicated on the construction set forth wherein said first valve comprises a flat sector-shaped plate superimposed against the underneath side of said first lid and rotatable between circumferentially spaced stop pins affixed to and depending from said first lid, said second valve comprising an arcuate flange affixed to and rising perpendicularly from the top side of said first lid in a position to cover and uncover said slot in the sequence of manual operation hereinbefore set forth.

Further novelty is predicated on the structural combination above recited and wherein the secondary relatively rotatable cap is removably keyed on a stem or stub shaft carried by the first named valve or plate whereby to promote a construction wherein the parts may be readily assembled or disassembled and wherein the secondary cap and first named valve operate as an entity.

Other objects, features and advantages will become more readily apparent from the following description and the accompanying sheet of illustrative, but not restrictive, drawings.

In the accompanying drawings wherein like numerals are employed to designate like parts through the views:

Fig. 1 is a perspective view of the improved closure showing the manner in which it is mounted on the jar and showing the dispensing slot covered or closed;

Fig. 2 is a section on the line 2—2 of Fig. 1 looking in the direction of the arrows;

Fig. 3 is an enlarged horizontal section on the line 3—3 of Fig. 2;

Fig. 4 is an elevational view showing the jar inverted;

Fig. 5 is a section, slightly enlarged, on the line 5—5 of Fig. 4;

Fig. 6 is a view of the jar inverted illustrating its mode of dispensing; and

Fig. 7 is a section on the line 7—7 of Fig. 6.

Referring now to the drawings the coffee jar or equivalent container is denoted by the numeral 8. It has the usual screw threaded neck to accommodate the primary cap. This is denoted by the numeral 10 and comprises a flat disk-like lid 12 having an off-center opening 14 by way of which coffee is emptied by gravity from the jar. The screw threaded rim is denoted at 16 and this is screwed on the screw threaded neck in the manner shown in Fig. 2. The rim is provided with an outstanding knurled finger-grip or ring 18, the upper flat endless surface of which provides an annular ledge 20. On its underneath side the lid is provided with circumferentially spaced stop lugs 22 and the center of the lid is provided with an axially disposed bearing hole 24 for a stub shaft 26 carried by and perpendicular to the flat horizontally disposed sector-shaped valve plate 28. This has flat wiping contact with the underneath side of the lid 12 and it operates between the stops 22 so that it may be swung from the open position seen in Fig. 5 to the closed position seen in Fig. 7.

The companion and therefore complemental upper or secondary cap is denoted by the numeral 30 and this comprises an imperforate disk-like lid 32 which is disposed in spaced parallelism above the lid 12 and therefore defines a trapping chamber or trap 34 between the parts as shown in Fig. 2. The underneath central portion of the lid 32 has a depending hub 36 which is removably keyed on the upper splined end of the stub shaft, whereby the cap 30, stub shaft and valved plate 28 become a turnable unit. Cap 30 also has a depending externally knurled rim 38 fitting telescopically over the primary cap or rather the rim 16 thereof with the lower edge resting rotatably on the ledge 20. On one side the rim is cut out to provide what is here designated as a dispensing slot 40. Mounted atop the marginal edge of the lid 12 is an arcuate flange 42 of appropriate length (Fig. 3) which has wiping contact with the inner peripheral surface of the rim 38. This constitutes the second or valving element and therefore functions to open and close the slot 40 in an obvious manner. In practice the two caps may be constructed of a suitable grade of commercial plastics and made transparent to facilitate operating the valves; or suitable markings to show the open and closed positions may be provided. In any event, when the valve plate 28 is open and the opening 14 is uncovered the slot 40 is simultaneously covered. Therefore, by turning the jar upside down the trap 34 may be charged or loaded with a teaspoonful of coffee. By placing the jar in the inverted inclined position seen in Fig. 6 and holding the jar with one hand and turning the relatively rotatable cap 30 with the other hand, the slot 40 is uncovered and the coffee is emptied into the cup.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A measuring and dispensing closure for an instant coffee jar or the like comprising: a readily attachable and detachable primary cap embodying a flat disk-like lid having at least one opening through which coffee is gravity discharged when the jar is intentionally held in an inverted dispensing position, an endless screw-threaded attaching rim having an outstanding annular gripping ring the upper surface of which functions as a ledge, said lid also having a centrally disposed bearing hole and being provided on its underneath side with circumferentially spaced stop pins, the latter occupying given fixed positions relative to said discharge opening, a second cap embodying an imperforate lid disposed in spaced parallelism above and aligned with said first lid, and an endless depending rim fitted telescopically over said first named rim with its lower edge resting rotatably atop said ledge and provided at a prescribed place with a coffee emptying and dispensing slot, an arcuate flange fixed atop said first lid and cooperating with the inner periphery of said second named rim and functioning to cover and uncover said slot, a sector-shaped flat plate valve contacting the underneath side of said first named lid, alternatively engageable with said stop pins and serving to cover and uncover said discharge opening, said plate valve having an integral upstanding axially disposed stub-shaft passing upwardly through said bearing hole and having its upper end removably keyed in a hub provided therefor on the central underneath side of said second named lid.

2. A measuring and dispensing closure for an instant coffee jar or the like comprising: a readily attachable and detachable primary cap embodying a flat disk-like lid having at least one opening through which coffee is gravity discharged when the jar is intentionally held in an inverted dispensing position, a secondary cap connected to and mounted for rotation on said primary cap and embodying an imperforate lid disposed in spaced parallel alignment above said first named lid and cooperating therewith in defining and providing a coffee receiving, measuring, and dispensing trap, said secondary cap having a marginal rim provided with a trap emptying slot, a first valve carried by and turnable with said second cap and adapted to open and close said discharge opening, and a second valve fixedly mounted atop said first named lid and cooperating with said rim and slot in a manner to open and close said slot, said valves being arranged relative to each other and said discharge opening and slot that when the slot is closed, the discharge opening is open and vice versa, whereby coffee may be suitably measured and then dispensed into a cup, said first valve comprising a flat sector-shaped plate superimposed against the underneath side of said first lid and rotatable between circumferentially spaced stop pins affixed to and depending from said first lid, said second valve comprising an arcuate flange affixed to and rising perpendicularly from the top side of said first lid in a position to cover and uncover said slot in the sequence of manual operation hereinbefore set forth.

3. The structure defined in claim 2, and wherein said first valve is provided with a fixed stub-shaft rotatable in a bearing hole centrally located in said first lid, said second lid being separably but operatively connected with said stub-shaft, whereby said secondary cap, stub-shaft, and first valve operate in unison and turn relative to said primary cap.

References Cited in the file of this patent

UNITED STATES PATENTS

| | | |
|---|---|---|
| 604,112 | Fergusson | May 17, 1898 |

FOREIGN PATENTS

| | | |
|---|---|---|
| 477,516 | Great Britain | Jan. 3, 1938 |